(12) United States Patent
Shin et al.

(10) Patent No.: US 9,580,627 B2
(45) Date of Patent: Feb. 28, 2017

(54) DISPLAY DEVICE

(71) Applicant: SAMSUNG DISPLAY CO., LTD., Yongin, Gyeonggi-Do (KR)

(72) Inventors: Dong-Myung Shin, Cheonan-si (KR); Young Ji Kim, Hwaseong-si (KR); Hyo Young Mun, Daegu (KR)

(73) Assignee: Samsung Display Co., Ltd., Yongin-si (KR)

( * ) Notice: Subject to any disclaimer, the term of this patent is extended or adjusted under 35 U.S.C. 154(b) by 89 days.

(21) Appl. No.: 14/199,961

(22) Filed: Mar. 6, 2014

(65) Prior Publication Data
US 2015/0086740 A1    Mar. 26, 2015

(30) Foreign Application Priority Data

Sep. 24, 2013  (KR) ........................ 10-2013-0113511

(51) Int. Cl.
| | |
|---|---|
| *C09J 7/02* | (2006.01) |
| *B32B 37/12* | (2006.01) |
| *B32B 38/10* | (2006.01) |
| *B32B 37/00* | (2006.01) |
| *B32B 38/00* | (2006.01) |
| *G02F 1/1333* | (2006.01) |

(52) U.S. Cl.
CPC ......... *C09J 7/0239* (2013.01); *B32B 37/0076* (2013.01); *B32B 37/1292* (2013.01); *G02F 1/133305* (2013.01); *B32B 38/0008* (2013.01); *B32B 2307/728* (2013.01); *B32B 2307/73* (2013.01); *B32B 2457/20* (2013.01); *C09J 2201/28* (2013.01); *C09J 2203/318* (2013.01); *C09J 2423/046* (2013.01); *C09J 2467/006* (2013.01); *C09J 2471/006* (2013.01); *C09J 2481/006* (2013.01); *G02F 2202/28* (2013.01); *Y10T 428/14* (2015.01); *Y10T 428/1476* (2015.01); *Y10T 428/24802* (2015.01)

(58) Field of Classification Search
CPC  C09J 7/0239; C09J 2201/28; C09J 2203/318; C09J 2423/046; C09J 2467/006; C09J 2471/006; C09J 2481/006; B32B 37/1292; B32B 37/0076; B32B 2457/20; B32B 38/0008; B32B 2307/728; B32B 2307/73; Y10T 428/1476; Y10T 428/24802; Y10T 428/14; Y10T 428/28
See application file for complete search history.

(56) References Cited

U.S. PATENT DOCUMENTS

| | | | |
|---|---|---|---|
| 2004/0115412 A1* | 6/2004 | Baron ................ | A61B 5/14532 428/214 |
| 2005/0167026 A1* | 8/2005 | Dronzek ............... | B65B 61/182 156/69 |
| 2015/0004345 A1* | 1/2015 | Chaung ..................... | C09J 5/00 428/41.7 |

FOREIGN PATENT DOCUMENTS

| | | |
|---|---|---|
| JP | 2012-220877 A | 11/2012 |
| KR | 10-0967362 B1 | 6/2010 |
| KR | 10-2012-0139577 A | 12/2012 |

* cited by examiner

*Primary Examiner* — Patricia L Nordmeyer
(74) *Attorney, Agent, or Firm* — Lewis Roca Rothgerber Christie LLP

(57) ABSTRACT

A flexible display device includes a protection film and a display panel, and the protection film includes a carrier film and an adhesive layer on the carrier film and including a plurality of adhesive dots separated from each other.

7 Claims, 6 Drawing Sheets

DISPLAY DEVICE

CROSS-REFERENCE TO RELATED APPLICATION

This application claims priority to and the benefit of Korean Patent Application No. 10-2013-0113511, filed in the Korean Intellectual Property Office on Sep. 24, 2013, the entire content of which is incorporated herein by reference.

BACKGROUND

1. Field

Aspects of the present invention relate to a display device and a manufacturing method thereof.

2. Description of the Related Art

Current popular display devices include a liquid crystal display (LCD), a plasma display panel (PDP), an organic light emitting diode (OLED) display, a field effect display (FED), and an electrophoretic display (EPD).

The organic light emitting diode (OLED) display includes a plurality of OLEDs each including a hole injection electrode, an organic emission layer, and an electron injection electrode, and each OLED emits light due to energy generated when excitons, generated by electrons and holes are combined, drop from an excited state to a ground state, and the OLED display displays an image by using the light.

Because the OLED display has a self-luminance characteristic and a separate light source is not required, unlike a liquid crystal display, thickness and weight thereof may be reduced as compared to the liquid crystal display. Further, because the organic light emitting diode display exhibits high quality characteristics such as low power consumption, high luminance, and rapid response speed, the organic light emitting diode display is receiving attention as a next generation display device.

When the liquid crystal display or the organic light emitting display is used as a display device of, for example, a television, the size of a screen thereof may be relatively large. When the size of the liquid crystal display or the organic light emitting display is relatively large, a difference in the visual field increases according to whether a viewer views a center portion of the screen or views left and right sides of the screen.

To compensate for such difference in the visual field, it is possible to form a display device in a curved shape by bending the display device to have in a concave shape or a convex shape. The display device may be provided in a portrait format having greater vertical length than horizontal length and be bent along a vertical direction based on the viewer, or may be provided in a landscape format having less vertical length than horizontal length and be bent along a horizontal direction based on the viewer.

However, when forming the display device in a curved shape by bending the display device, a curvature radius of a protection film is limited such that there is a limit to the curvature radius desired by a user or a manufacturing company.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a display device including a protection film with which it is easy to control a curvature radius, and a manufacturing method thereof.

A display device according to an example embodiment of the present invention includes a protection film and a display panel, wherein the protection film includes a carrier film and an adhesive layer on the carrier film and including a plurality of adhesive dots separated from each other.

The protection film may further include a release film on the adhesive layer and configured to be detachable.

The carrier film may include a hydrophobic region and a hydrophilic region, and the plurality of adhesive dots may be at the hydrophobic region or the hydrophilic region.

The plurality of adhesive dots may be at the hydrophilic region.

The plurality of adhesive dots may form an embossed texture.

The carrier film may include polyethylene terephthalate (PET), polyethylene naphthalate (PEN), polyethersulfone (PES), and/or polyethylene (PE).

The protection film may be at one surface of the display panel.

A manufacturing method of a display device according to an example embodiment of the present invention includes preparing a display panel and adhering a protection film to one surface of the display panel, wherein the protection film includes a carrier film and an adhesive layer on the carrier film and including a plurality of adhesive dots separated from each other.

The carrier film may be manufactured by treating one surface of the carrier film to form a hydrophilic region or a hydrophobic region.

The surface treating of the one surface of the carrier film may include plasma treating.

The plurality of adhesive dots may be at the hydrophilic region or the hydrophobic region.

The plurality of adhesive dots may be at the hydrophilic region.

The plurality of adhesive dots may be formed by a non-continuous spray unit.

The method may further include hardening the adhesive layer and removing a release film on the adhesive layer, the release film being configured to be detachable.

The plurality of adhesive dots may form an embossed texture.

According to aspects of the example embodiments, the protection film has excellent flexibility such that it is easy to control a curvature radius of a curved display device, and the manufacturing method thereof is also included.

DETAILED DESCRIPTION

Figure 1:
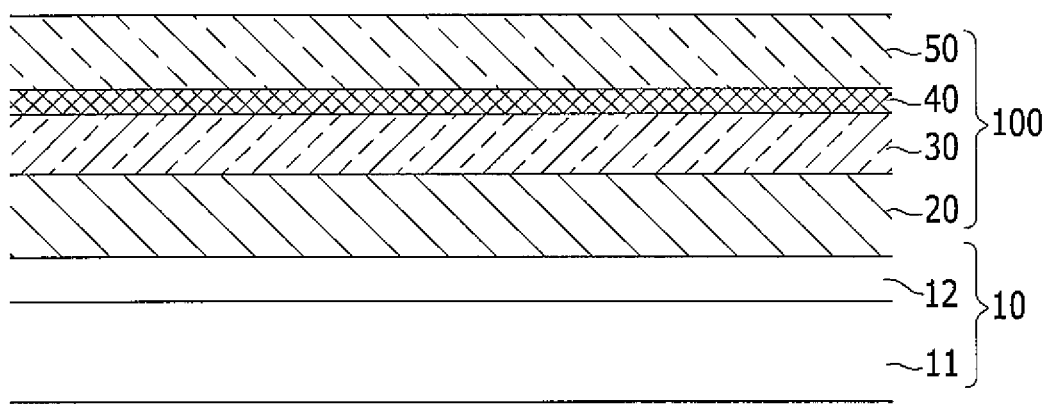
FIG. 1 is a cross-sectional view of a display device according to an example embodiment of the present invention.

The present invention will be described more fully hereinafter with reference to the accompanying drawings, in which example embodiments of the invention are shown. As those skilled in the art would realize, the described embodiments may be modified in various different ways, all without departing from the spirit or scope of the present invention.

To clearly describe the present invention, some aspects of the described embodiments may be omitted. Like numerals refer to like or similar constituent elements throughout the specification.

The size and the thickness of each component illustrated in the drawings are arbitrarily illustrated for better understanding and ease of description, and the present invention is not limited to the illustrations. In the drawings, the thicknesses of various portions and regions may be enlarged for clarity.

In the drawings, the thickness of layers, films, panels, regions, etc., are exaggerated for clarity. In the drawings, the thicknesses of some layers and areas may be exaggerated for convenience of explanation. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Throughout this specification, it is understood that the term "on" and similar terms are used generally and are not necessarily related to a gravitational reference (i.e., the direction of the gravitational force between a reference element and the Earth). Further, the use of "may" when describing embodiments of the present invention refers to "one or more embodiments of the present invention."

Figure 3:
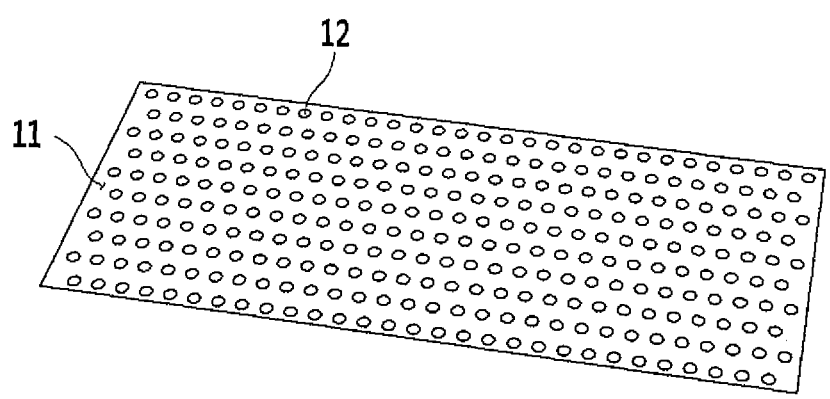
FIG. 3 is a perspective view of a carrier film and an adhesive layer according to the example embodiment of the present invention shown in FIG. 2.
Figure 4:
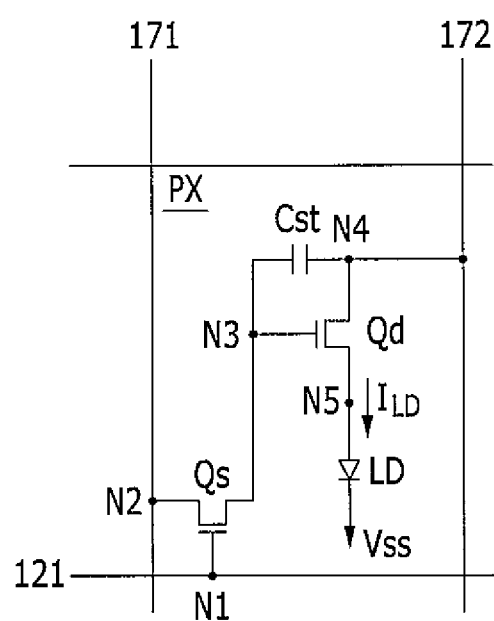
FIG. 4 is a circuit diagram of a display device according to an example embodiment of the present invention.
Figure 5:
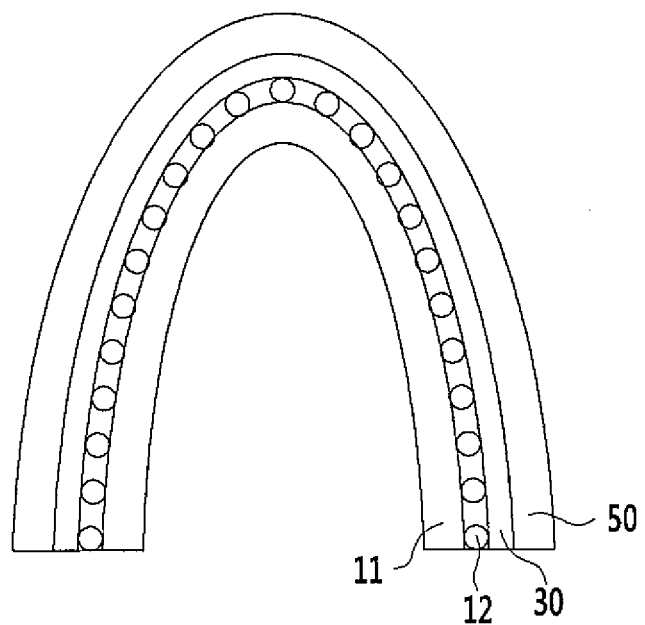
FIG. 5 is a cross-sectional view of a display device according to an example embodiment of the present invention.

Next, a display device according to an example embodiment of the present invention will be described with reference to FIG. 1 to FIG. 5. FIG. 1 is a cross-sectional view of a display device according to an example embodiment of the present invention, FIG. 2 is a cross-sectional view of a protection film according to an example embodiment of the present invention, FIG. 3 is a perspective view of a carrier film and an adhesive layer according to the example embodiment of the present invention shown in FIG. 2, FIG. 4 is a circuit diagram of a display device according to an example embodiment of the present invention, and FIG. 5 is a cross-sectional view of a display device according to an example embodiment of the present invention.

First, referring to FIG. 1, a display device includes a display panel 100 displaying images (e.g., configured to display images), for example, an organic light emitting panel, and a protection film 10 (e.g., a lower protection film) attached to (e.g., attached under or attached to a bottom of) the display panel 100.

Figure 2:
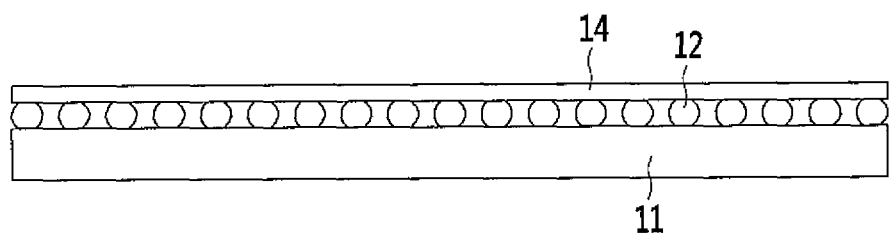
FIG. 2 is a cross-sectional view of a protection film according to an example embodiment of the present invention.

Referring to FIG. 1 and FIG. 2, the protection film 10 includes a carrier film 11, an adhesive layer 12, and a release film (liner) 14.

The carrier film 11 may include polyethylene terephthalate (PET), polyethylene naphthalate (PEN), polyethersulfone (PES), and/or polyethylene (PE).

The carrier film 11 may have a thickness of from about 25 μm to about 300 μm. When the thickness of the carrier film 11 is less than about 25 μm, the carrier film 11 is relatively very thin such that it is difficult to function as a protection portion of a protection film 10 protecting a lower portion of the display panel 100 (that is, it may not completely protect a lower portion of the display panel 100), and when the thickness of the carrier film 11 is more than about 300 μm, the thickness of the organic light emitting device may be unnecessarily increased or unnecessarily thick when the protection film 10 for the display device is attached to the display panel 100.

Due to a treatment (e.g., a predetermined or previously completed treatment) of the carrier film 11, one surface thereof may include a hydrophobic region and/or a hydrophilic region. In the present embodiment, to form the hydrophobic and/or the hydrophilic regions on one surface of the carrier film 11, a plasma treatment is performed, however it is not limited thereto and any suitable method may be performed. Also, in one embodiment of the present invention, the carrier film 11 is only divided into the hydrophilic region and the hydrophobic region, however it may be divided into more than two separate regions having different characteristics (e.g., different material characteristics).

One surface of the carrier film 11 on which the adhesive layer 12 is positioned has both the hydrophobic and the hydrophilic regions, and the adhesive layer 12 that will be further described later may be positioned at a region corresponding to the hydrophobic region or the hydrophilic region. The described surface of the carrier film 11 is a surface thereof facing the display panel 100.

The adhesive layer 12 should maintain adhesion during a process of attaching the carrier film 11 to the display panel 100, and is detached after completing a cell cutting process such that the adhesive layer 12 has an adhesion force in a range (e.g., has upper/lower limitations or is in a predetermined range).

For example, the protection film 10 is adhered (e.g., permanently adhered) to a display substrate 20 such that the adhesive layer 12 has strong adhesion force. That is, while the manufacturing process is performed, the protection film 10 should not become unintentionally detached or separated. Thus, the adhesive layer 12 may be a strong adhesion film including, for example, an acryl-based material, and the adhesion force of the adhesive layer 12 may be more than about 500 gf/inch (gram-force/inch) when a material to be adhered is stainless steel (SUS).

When the material to be adhered is stainless steel (SUS), the adhesive layer 12 may have adhesion force of from about 1 gf/inch to about 500 gf/inch. To maintain the adhesion force of the adhesive layer 12 while processes are performed, the adhesive layer 12 has adhesion force of about 1 gf/inch at a minimum. In addition, when the adhesion force of the adhesive layer 12 is over about 500 gf/inch, partial peeling of the protection film 10 or partial detachment of an outer area thereof may occur or damage (e.g., surface peeling) to a thin film encapsulation layer 40 may occur when the protection film 10 is removed.

On the other hand, the adhesive layer 12 may have adhesion force of about 3.7 gf/inch to about 8.4 gf/inch when polyethylene terephthalate (PET) is the substance to be adhered.

By improving repulsion resistance (e.g., by improving the adhesive force) of the adhesive layer 12, when the protection film 10 is bent the display substrate 20 of the organic light emitting panel 100 and the protection film 10 may not separate from each other.

The adhesive layer 12 according to an example embodiment of the present invention may have a non-continuous shape or arrangement. For example, as shown in FIG. 2 and FIG. 3, the adhesive layer 12 may include a plurality of adhesive dots that are separated (e.g., mutually separated or arranged).

Each of the plurality of adhesive dots may have a circular cross-sectional as one example, and a surface (e.g., a plane or flat surface) of the entire adhesive layer 12 may have an embossed shape or texture. When the plurality of adhesive dots are separated from each other (e.g., spaced from each other) and the adhesive layer 12 has the embossed shape or texture, flexibility is excellent compared with the case where the adhesive layer 12 is formed as a sheet (e.g., a continuous sheet). However, the shape of the plurality of adhesive dots is not limited thereto, and the plurality of adhesive dots that are separated and positioned between the carrier film 11 and the release film 14 may have any shape.

Among the plurality of adhesive dots, adjacent adhesive dots are separated by the same or similar intervals (e.g., the plurality of adhesive dots may be regularly arranged), and they may have the same or similar thickness and shape. However, the plurality of adhesive dots may respectively have different sizes and may be separated by different intervals. The intervals and relative sizes of the plurality of adhesive dots may be determined to provide a desired characteristic of the protection film 10 so that the display device may be flexible.

On the other hand, spaces between the plurality of adhesive dots having a size and an interval that are equal or similar to each other, and for example, the plurality of adhesive dots may be separated by the same or similar intervals. An impact or force applied to the carrier film 11 may be absorbed through or by the separated spaces. As a comparative example, when an impact or force is applied to a carrier film of a protection film without the separated spaces, the corresponding impact is transmitted (e.g., directly transmitted) to the adhesive layer without significant absorption or reduction of the force, and the adhesive layer transmits substantially all of the force to the display panel 100.

However, according to the example embodiment of the present invention, the protection film 10 includes the separated spaces, and when an impact or force is applied to the carrier film 11, the separated spaces may absorb or reduce the impact such that the force may be prevented from being transmitted to the display panel 100.

The adhesive layer 12 may be formed by any suitable method to have the arrangement (e.g., the shape) shown in FIG. 1 to FIG. 3, and as one example, the adhesive layer 12 may be positioned at the hydrophobic region and/or the hydrophilic region of the carrier film 11. For example, the adhesive layer 12 may be positioned at the region of the carrier film 11 processed to be hydrophilic. As described, in the case that the adhesive layer 12 is positioned at the hydrophilic or hydrophobic region, the plurality of separated adhesive dots, as shown in FIG. 3, may be formed. Also, the plurality of adhesive dots may be positioned (e.g., solely positioned) at one region among a plurality of regions having the hydrophilic or hydrophobic characteristics.

For the adhesive layer 12 to have the above-described arrangement or shape, a suitable spray unit used to coat the adhesive may be utilized. When coating the adhesive through a non-continuous spray nozzle, such as that shown in FIG. 7 that will be further described later, a plurality of adhesive dots may be formed without a surface treatment. That is, when forming the adhesive layer 12 utilizing the non-continuous spray nozzle the surface treatment of the carrier film 11 may be unnecessary.

Instead of the adhesive layer positioned on or over the entire carrier film 11 (e.g., the continuous adhesive layer), in an example embodiment of the present invention, the flexibility of the display device attached to the protection film 10 is improved by the protection film 10 including the adhesive layer 12 that has the separated (e.g., non-continuous) adhesive (i.e., the adhesive layer 12 including the plurality of adhesive dots). Accordingly, the display device may have various curvature radiuses.

Also, the protection strength or characteristics of the protection film 10 is improved such that the influence of an impact or force to the display panel 100 may be reduced. When the impact is applied to the exposed surface (e.g., the other surface) of the carrier film 11, the impact is absorbed into or by the spaces between the separated adhesive dots such that the impact applied to the entire display panel 100 may be reduced.

The release film 14 is a protecting film for preventing contamination and external contact of the adhesive layer 12. The release film 14 is positioned on the adhesive layer 12 before the protection film 10 is adhered to the display panel 100 and is removed before the protecting film 10 is attached to the display panel 100 so that the adhesive layer 12 may be attached (e.g., directly attached) to the display panel.

The protection film 10 is adhered under the display substrate 20 of the display panel 100 after the release film 14 is removed, and for example, the adhesive layer 12 of the protection film 10 is adhered to (e.g., directly adhered to) the display substrate 20.

As described above, by adhering the protection film 10 under the display substrate 20, the display substrate 20 may not directly or physically be exposed to or contact the outside such that physical damage to the display substrate 20 may be prevented and handling of the organic light emitting device is easier.

Next, referring to FIG. 1, the display panel 100 includes the display substrate 20, an organic light emitting element 30 formed on the display substrate 20, the thin film encapsulation layer 40 covering the organic light emitting element 30, and an upper protection film 50 on (e.g., attached to) the thin film encapsulation layer 40.

The display substrate 20 may be a transparent substrate and may be a flexible substrate, for example, a polymer film.

The organic fight emitting element 30 includes a plurality of signal lines 121, 171, and 172 and a pixel (PX) connected thereto. Referring to FIG. 4, the pixel (PX) may be a red pixel (R), a green pixel (G), or a blue pixel (B). The plurality of signal lines includes scanning signal lines 121 for transmitting a gate signal (or a scan signal), data lines 171 for transmitting a data signal, and driving voltage lines 172 for transmitting a driving voltage. The scan signal lines 121 are substantially extended along a row direction and are substantially parallel with each other, and the data lines 171 are substantially extended along a column direction and are substantially parallel with each other. The driving voltage lines 172 are shown to be substantially extended along the column direction, but they may be extended along the row direction or the column direction or formed into a mesh net (e.g., a matrix with crossing data lines 171).

The pixel (PX) includes a thin film transistor including a switching transistor (Qs), a driving transistor (Qd), a storage capacitor (Cst), and an organic light emitting element (LD).

The switching transistor (Qs) includes a control terminal N1, an input terminal N2, and an output terminal N5, and the control terminal N1 is connected to the scan signal line 121, the input terminal N2 is connected to the data line 171, and the output terminal N3 is connected to the driving transistor (Qd). The switching transistor (Qs) transmits the data signal provided by the data line 171 to the driving transistor (Qd) in response to the scan signal provided by the scan signal line 121.

The driving transistor (Qd) includes a control terminal N3, an input terminal N4, and an output terminal N5, and the control terminal N3 is connected to the switching transistor (Qs), the input terminal N4 is connected to the driving voltage line 172, and the output terminal N5 is connected to the organic light emitting element (LD). The driving transistor (Qd) outputs an output current ($I_{LD}$) that is variable according to a voltage difference between the control terminal N3 and the output terminal N5.

The capacitor Cst is connected between the control terminal N3 and the input terminal N4 of the driving transistor (Qd). The capacitor Cst charges the data signal applied to the control terminal N3 of the driving transistor (Qd) and maintains the charge when the switching transistor (Qs) is turned off.

The organic light emitting element (LD) (is for example, an organic light emitting diode (OLED)), includes an anode connected to the output terminal N5 of the driving transistor (Qd), and a cathode connected to a voltage source (Vss). The organic light emitting element (LD) displays the image by emitting light with different intensity depending on the output current ($I_{LD}$) of the driving transistor (Qd). The organic light emitting element (LD) may include an organic material for emitting at least one of primary colors (i.e., red, green, and blue), and the organic light emitting device displays the desired image by a spatial sum of the colors.

The switching transistor (Qs) and the driving transistor (Qd) may be n-channel field effect transistors (FETs), but at least one of them may be a p-channel field effect transistor (FET). Also, the connection between the transistors (Qs and Qd), the capacitor (Cst), and the organic light emitting element (LD) may be variously modified.

The thin film encapsulating film 40 opposes (e.g., faces) the display substrate 20 and protects the organic light emitting element 30 by preventing oxygen and moisture from penetrating therein from the outside.

The thin film encapsulating film 40 may be easily damaged by, for example, piercing or scratching by a foreign substance or object during manufacturing. The damage appears as a defect, such as a dark spot on the display.

The upper protection film 50 positioned on the thin film encapsulation layer 40 may be a functional film, such as a polarization film. The polarization film transmits light in the same axis direction as a polarization axis of the polarization film and absorbs or blocks light in different axis. That is, the light penetrating the polarization film is linearly polarized. Various kinds of suitable polarization films may be used as the polarization film. For example, the polarization film may be made of tri-acetate cellulose (TAC), polyvinyl alcohol, etc. To prevent damage to the thin film encapsulation layer 40, the upper protection film 50 is adhered to the thin film encapsulation layer 40. The upper protection film 50 may alternatively include the carrier film, the adhesive layer, and the release film similar to the protection film 10 and different from the described polarization film.

As described, during the manufacturing process, the upper protection film 50 protects the thin film encapsulation layer 40 but the protection provided by the upper protection film 50 is not limited to providing protection during the manufacturing process.

Referring to FIG. 5, a schematic diagram of a display device according to an example embodiment of the present invention will be described. The protection film 10 is adhered to the display panel 100 through the adhesive layer 12 after removing the release film 14. As shown in FIG. 5, the variable display panel 100 and protection film 10 may be bent with a relatively larger curvature radius compared to the continuous adhesive layer. Accordingly, a display device having a desired curvature radius according to the user or the manufacturing company may be provided.

Figure 6:
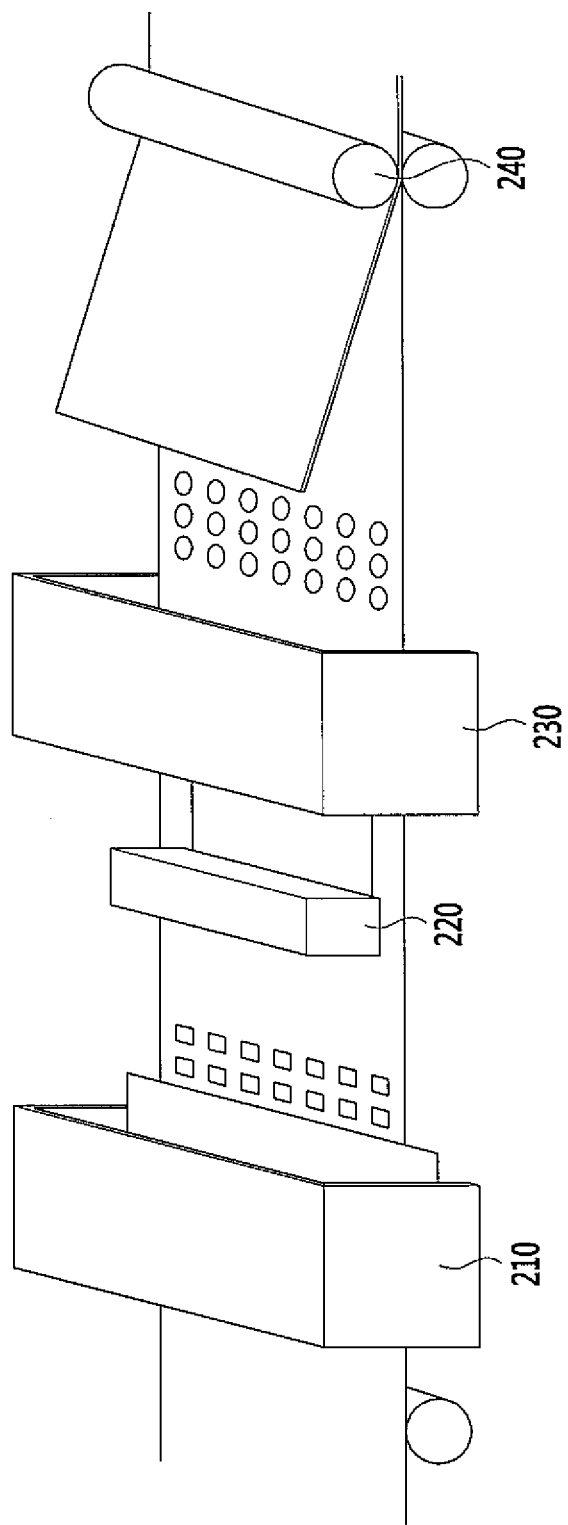
FIG. 6 is a schematic view of a manufacturing process of a protection film according to an example embodiment of the present invention.
Figure 7:
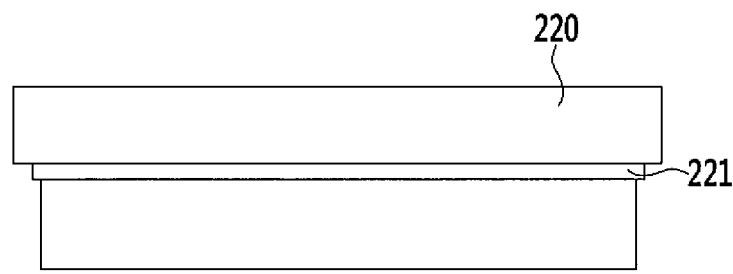
FIG. 7 and FIG. 8 are cross-sectional views of a spray unit according to an example embodiment of the present invention.
Figure 8:
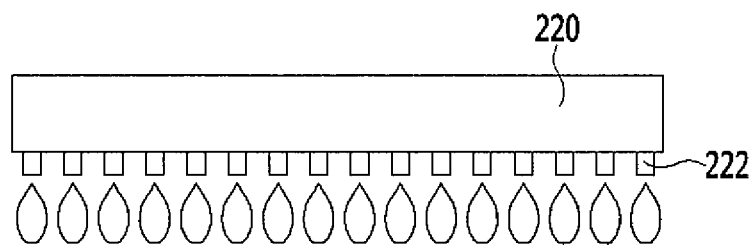

A manufacturing method of a protection film according to an example embodiment of the present invention will be described with reference to FIG. 6 to FIG. 8. FIG. 6 is a schematic view of a manufacturing process of a protection film according to an example embodiment of the present invention, and FIG. 7 and FIG. 8 are cross-sectional views of spray units according to example embodiments of the present invention.

First, a carrier film 11 is prepared. The carrier film 11 may include polyethylene terephthalate (PET), polyethylene naphthalate (PEN), polyethersulfone (PES), and/or polyethylene (PE).

The carrier film 11 may have a thickness from about 25 μm to about 300 μm. When the thickness of the carrier film 11 is less than about 25 μm, the carrier film 11 is relatively very thin such that it is difficult to function as a protection film protecting a lower portion of the display panel 100 (that is, it may not completely protect a lower portion of the display panel 100), and when the thickness of the carrier film 11 is greater than about 300 μm, it is difficult for the organic light emitting device to have flexibility when the protection film 10 for the display device 100 is attached to the display panel 100 (e.g., the organic light emitting device may have reduced flexibility).

The act of preparing the carrier film 11, as shown in FIG. 6, may include an act of processing one surface of the carrier film 11 to include a hydrophobic region and/or a hydrophilic region through a surface treatment unit 210. This is to position (e.g., selectively position) the adhesive forming the adhesive layer 12 on the carrier film 11. In the present example embodiment, dividing the carrier film 11 into the hydrophilic region and the hydrophobic region through the surface treatment process is described, however it is not limited thereto, and any suitable process to form the separate regions according to the desired characteristics may be utilized.

As one example, when the adhesive is hydrophilic, the region where the adhesive is positioned on the carrier film 11 is subjected to the hydrophilic treatment, and the region where the adhesive is not positioned is subjected to the hydrophobic treatment. Alternatively, when the adhesive is hydrophobic, the region where the adhesive is positioned on the carrier film 11 is subjected to the hydrophobic treatment, and the region where the adhesive is not positioned is subjected to the hydrophilic treatment.

As described above, any suitable method for the hydrophobic treatment of the portion of the carrier film 11 and the hydrophobic treatment of the other portion thereof may be utilized, and for example, as shown in FIG. 6, the plasma-surface treatment unit 210 utilizing a mask may be used.

Next, the adhesive is coated on one surface of the carrier film 11 by using a spray unit 220. When the adhesive is hydrophilic, the adhesive may only be positioned at the hydrophilic region of the carrier film 11, and when the adhesive is hydrophobic, the adhesive may only be positioned at the hydrophobic region of the carrier film 11. Accordingly, the adhesive is partially (e.g., non-continuously or selectively) positioned on one surface of the carrier film 11.

As one example embodiment of the present invention, FIG. 6 shows the method of plasma-processing one surface of the carrier film 11 to form the adhesive layer 12 in which the adhesive is partially positioned (e.g., selectively positioned), however it is not limited thereto, and any suitable method of coating the adhesive layer 12 to have a desired shape or arrangement may be applied without additional treatment to one surface of the carrier film 11.

Referring to FIG. 7 and FIG. 8, FIG. 7 shows the spray unit 220 for the adhesive utilized when one surface of the carrier film 11 has been surface-treated by the plasma treatment. The spray unit 220 shown in FIG. 7 includes a nozzle 221 that does not partially or non-continuously spray (e.g., selectively spray) the adhesive, such that the adhesive is partially positioned due to the surface treatment of the carrier film 11.

Alternatively, the spray unit 220 shown in FIG. 8 includes a nozzle 222 that is capable of partially or non-continuously spraying (e.g., selectively spraying) the adhesive, such that it is possible to coat the adhesive having the non-continuous shape (e.g., the separately positioned adhesive or the plurality of adhesive dots) as shown in FIG. 2 and FIG. 3 without the surface treatment (e.g., without an additional surface treatment). That is, it is possible to form the adhesive layer 12 of the desired shape or position through the selection of a suitable spray unit, for example, the spray unit 220 shown in FIG. 8.

In summary, to form the adhesive layer 12 to be non-continuously positioned (e.g., selectively positioned) while having the embossed texture or shape, the surface treatment of the carrier film 11 or the control of the adhesive coating method may be used, however it is not limited to the described method and any suitable method may be used.

Next, the coated adhesive layer is hardened by a hardening unit 230, and the protection film 10 further including the release film 14 may be formed through an adhesion unit 240 adhering the release film 14 to the hardened adhesive layer.

Next, a manufacturing method of an organic light emitting device including the described protection film 10 will be described.

First, the organic light emitting panel 100 is formed on a supporting member. The supporting member supports the display panel 100 such that it may be easily handled. The display panel 100 includes the substrate 20, the organic light emitting element 30 formed on the substrate 20, the thin film encapsulation layer 40 covering the organic light emitting element 30, and the upper protection film 50 adhered to the thin film encapsulation layer 40.

The upper protection film 50 positioned on the thin film encapsulation layer 40 may be the functional film, such as the polarization film. However, it is not limited thereto, and the upper protection film 50 may include the carrier film, the adhesive layer, and the release film like the protection film 10 and different from the described polarization film.

Next, the supporting member is removed from the display panel 100. At this time, static electricity may be generated in the display panel 100 due to friction between the display panel 100 and the supporting member.

Next, the protection film 10 according to an example embodiment of the present invention is prepared. The protection film 10 includes the carrier film 11, the adhesive layer 12 formed on the carrier film 11, and the release film 14 adhered to the adhesive layer 12 by the adhesive layer 12.

The release film 14 is a protecting film for preventing contamination and external contact of the adhesive layer 12, and it is removed before the protecting film 10 is attached under the substrate 20 of the display panel 100 so that the adhesive layer 12 may be easily and securely attached to the bottom of the substrate 20.

When the release film 14 is detached from the adhesive layer 12—a strong adhesive film—the release film 14 may be damaged by a force used to detach the release film 14. Therefore, the inner side of the release film 14 may be coated to be about 0.1 µm to about 2 µm thick with silicone by using, for example, a gravure coating method such that the release film 14 is easily detached.

Next, the release film 14 is detached from the protecting film 10, and the lower protecting film 10 is attached to the bottom of the display panel 100. The protection film 10 is adhered under the substrate 20 of the display panel 100.

A cutter is used to cut the display panel 100 and the lower protecting film 10 into a plurality of organic light emitting devices.

As described above, the completed organic light emitting device that includes the adhesive layer 12 that is non-continuously formed (e.g., selectively formed) and that improves the flexibility of the organic light emitting device, thereby forming a display device that may be bent with an appropriate curvature radius.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

| Description of Reference Symbols | |
| --- | --- |
| 10: protection film | 11: carrier film |
| 12: adhesive layer | 14: release film |
| 20: substrate | 30: organic light emitting element |
| 40: thin film encapsulation layer | 50: upper protection film |
| 100: organic light emitting panel | |

What is claimed is:

1. A display device comprising:
   a protection film; and
   a display panel comprising a pixel,
   wherein the protection film comprises:
      a carrier film comprising a hydrophobic region and a hydrophilic region, and
      an adhesive layer on the carrier film and comprising a plurality of adhesive dots separated from each other, the adhesive dots being at the hydrophilic region of the carrier film, and areas of the carrier film between the adhesive dots being the hydrophobic region.

2. The display device of claim 1, wherein the protection film further comprises a release film on the adhesive layer and configured to be detachable.

3. The display device of claim 1, wherein the plurality of adhesive dots form an embossed texture.

4. The display device of claim 1, wherein the carrier film comprises polyethylene terephthalate (PET), polyethylene naphthalate (PEN), polyethersulfone (PES), and/or polyethylene (PE).

5. The display device of claim 4, wherein the protection film is at one surface of the display panel.

6. The display device of claim 1, wherein the pixel is configured to emit light.

7. A display device comprising:
a protection film; and
a display panel comprising a pixel,
wherein the protection film comprises:
   a carrier film comprising a hydrophobic region and a hydrophilic region, and
   an adhesive layer on the carrier film and comprising a plurality of adhesive dots separated from each other, the adhesive dots being at the hydrophobic region of the carrier film, and areas of the carrier film between the adhesive dots being the hydrophilic region.

* * * * *